United States Patent [19]
Bélanger et al.

[11] Patent Number: 5,255,283
[45] Date of Patent: Oct. 19, 1993

[54] PROCESS FOR MAKING A CUSTOM PHASE-CONJUGATED CIRCULAR MIRROR TO BE USED IN A LASER RESONATOR THAT WILL SUIT SPECIFICATIONS OF A USER AND A CUSTOM PHASE-CONJUGATED CIRCULAR MIRROR MADE ACCORDING TO THE PROCESS

[75] Inventors: Pierre-André Bélanger, Ste-Foy; Claude Paré, St Augustin de Desmaures; Richard L. Lachance; Richard Van Neste, both of Sainte-Foy, all of Canada

[73] Assignee: Universite Laval, Quebec, Canada

[21] Appl. No.: 906,358

[22] Filed: Jun. 30, 1992

[51] Int. Cl.$^5$ .............................. H01S 3/08
[52] U.S. Cl. .......................... 372/99; 372/98; 372/92; 359/300
[58] Field of Search ............ 372/99, 98, 92; 359/290, 291, 292, 300, 240

[56] References Cited

U.S. PATENT DOCUMENTS

| | | | |
|---|---|---|---|
| 4,233,571 | 11/1980 | Wang et al. | 331/94.5 C |
| 4,500,855 | 2/1985 | Feinberg | 359/300 |
| 4,529,273 | 7/1985 | Cronin-Golomb et al. | 350/354 |
| 4,709,368 | 11/1987 | Fukuda et al. | 372/99 |
| 4,715,689 | 12/1987 | O'Meara et al. | 350/354 |
| 4,720,176 | 1/1988 | Klein et al. | 359/300 |
| 4,750,818 | 6/1988 | Cochran | 350/360 |
| 4,794,605 | 12/1988 | Aprahamian et al. | 372/99 |
| 4,803,694 | 2/1989 | Lee et al. | 372/98 |
| 4,875,219 | 10/1989 | Russell | 372/99 |

OTHER PUBLICATIONS

Optics Letters, vol. 16, No. 14, Jul. 15, 1991, "Optical resonators using graded-phase mirrors", P. A. Bélanger and C. Paré.

IEEE Journal of Quantum Electronics, vol. 28, No. 1, Jan. 1992, "Custom Laser Resonators Using Graded-Phase Mirrors", C. Paré and Pierre-André Bélanger.

"Super-Gaussian output from a $CO_2$ laser using a graded-phase mirror resonator", by Pierre-A. Bélanger, Richard L. Lachance, and Claude Paré, Feb. 1992 (submitted to Optics Letters).

*Primary Examiner*—Georgia Y. Epps
*Attorney, Agent, or Firm*—Michael D. Bednarek

[57] ABSTRACT

A process for making a custom phase-conjugated circular mirror to be used in a laser resonator that will suit specifications of a user is provided. The mirror reverses wavefront of one particular input beam $\Psi_o(x)$ determined by the user, the input beam $\Psi_o(x)$ having a given wavelength, the laser resonator including the mirror and an output coupler cooperating with the mirror and separated therefrom by a laser gain medium, the mirror being at a distance L from the output coupler. The process comprises steps of (a) determining the input beam $\Psi_o(x)$ that will suit need of the user; (b) calculating equation of $\Psi_L(x)$ which is a value of the input beam $\Psi_o(x)$ that is propagated through said laser gain medium at distance L; (c) calculating phase $\Phi_o(x)$ of the input beam, which is a phase of the input beam $\Psi_o(x)$ at distance L, the phase $\Phi_o(x)$ determining profile of the custom phase-conjugated mirror; and (d) fabricating the custom phase-conjugated mirror according to the profile determined in step (c), whereby a custom phase-conjugated mirror can be provided to suit the specifications of the user. There is also provided a mirror made according to the above-mentioned method.

16 Claims, 2 Drawing Sheets

PROCESS FOR MAKING A CUSTOM PHASE-CONJUGATED CIRCULAR MIRROR TO BE USED IN A LASER RESONATOR THAT WILL SUIT SPECIFICATIONS OF A USER AND A CUSTOM PHASE-CONJUGATED CIRCULAR MIRROR MADE ACCORDING TO THE PROCESS

FIELD OF THE INVENTION

The present invention relates to a process for making a custom phase-conjugated circular mirror to be used in a laser resonator that will suit specifications of a user, to a process for making a custom laser resonator that will suit specifications of the user, to a custom phase-conjugated circular mirror made according to the above-mentioned process, and to a custom laser resonator made according to the above-mentioned process.

BACKGROUND OF THE INVENTION

Known in the art, there is the U.S. Pat. No. 4,803,694 of Chun-Sheu LEE et al., granted on Feb. 7, 1989, wherein there is described a laser resonator having a cavity for the propagation of a laser beam having a wavefront in which a laser medium is positioned, comprising an aspherical concave mirror means disposed in the cavity facing an optical means for reflecting the expanded wavefront toward the lasing medium and correcting wavefront aberrations induced when the laser beam passes through the laser medium. The geometry of the aspherical concave mirror is defined by a predetermined equation.

This patent does not provide the necessary means or the necessary method steps by which a user can determine specifications from which a custom phase-conjugated circular mirror or a laser resonator including such mirror can be made.

Also known in the art, there is the U.S. Pat. Nos. 4,233,571; 4,529,273; 4,715,689; and 4,750,818, describing different conjugated mirrors, and lasers including such mirrors. But none of these patents describes the necessary means or the necessary method steps by which a user can determine specifications from which a conjugated mirror or a laser including such mirror can be made.

OBJECTS OF THE INVENTION

It is an object of the present invention to provide the necessary means or the necessary method steps by which a user can determine specifications from which a custom phase-conjugated circular mirror or a laser resonator including such mirror can be provided.

SUMMARY OF THE INVENTION

According to the present invention, there is provided a process for making a custom phase-conjugated circular mirror to be used in a laser resonator that will suit specifications of a user, said mirror reversing wavefront of one particular input beam $\Psi_o(x)$ determined by said user, said input beam $\Psi_o(x)$ having a given wavelength, said laser resonator including said mirror and an output coupler cooperating with said mirror and separated therefrom by a laser gain medium, said mirror being at a distance L from said output coupler, said process comprising steps of:

(a) determining said input beam $\Psi_o(x)$ that will suit need of said user;

(b) calculating equation of $\Psi_L(x)$ which is a value of said input beam $\Psi_o(x)$ that is propagated through said laser gain medium at said distance L, where:

$$\Psi_L(x) = (i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order;

(c) calculating phase $\Phi_o(x)$ of said input beam, which is a phase of said input beam $\Psi_o(x)$ at said distance L, where:

$$\Psi_L(x) = |\Psi_L(x)| e^{-i(2\pi/\lambda)\Phi_o(x)}$$

said phase $\Phi_o(x)$ determining profile of said custom phase-conjugated mirror; and (d) fabricating said custom phase-conjugated mirror according to said profile determined in step (c), whereby a custom phase-conjugated mirror can be provided to suit said specifications of said user.

Also according to the present invention, there is provided a process for making a custom laser resonator that will suit specifications of a user, said laser including a phase conjugated circular mirror which reverses wavefront of one particular input beam $\Phi_o(x)$ determined by said user, said input beam $\Phi_o(x)$ having a given wavelength, said laser resonator including an output coupler cooperating with said mirror and separated therefrom by a laser gain medium, said mirror being at a distance L from said output coupler, said process comprising steps of:

(a) determining said input beam $\Phi_o(x)$ that will suit need of said user;

(b) calculating equation of $\Phi_o(x)$ which is a value of said input beam $\Phi_o(x)$ that is propagated through said laser gain medium at said distance L, where:

$$\Psi_L(x) = (i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where A, B and D are constants determined by optioal elements in said laser gain medium, $x_o$ is an integration variable, x is radial distance in transverse direction of propagation, and $J_o$ is a Bessel function of zero order;

(c) calculating phase $\Phi_o(x)$ of said input beam, which is a phase of said input beam $\Psi_o(x)$ at said distance L, where:

$$\Psi_L(x) = |\Psi_L(x)| e^{-i(2\pi/\lambda)\Phi_o(x)}$$

said phase $\Phi_o(x)$ determining profile of said custom phase-conjugated mirror; and (d) fabricating said custom phase-conjugated mirror according to said profile determined in step (c), whereby a custom laser resonator can be provided to suit said specifications of said user.

Also according to the present invention, there is provided a custom phase-conjugated circular mirror to be used in a laser resonator that will suit specifications of a user, said mirror reversing wavefront of one particular input beam $\Psi_o(x)$ determined by said user, said input beam $\Psi_o(x)$ having a given wavelength, said laser resonator including said mirror and an output coupler cooperating with said mirror and separated therefrom by a laser gain medium, said mirror being at a distance L from said output coupler, said mirror having a profile determined by $\Phi_o(x)$ where:

$$\Psi_L(x) = |\Psi_L(x)| e^{-i(2\pi/\lambda)\Phi_o(x)}$$

where:

$$\Psi_L(x) = (i2\pi)/(\lambda B) \int_0^\infty \Psi_o(x_o) e^{(-i\pi/\lambda B)(Ax_o^2+Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order; whereby a custom phase-conjugated mirror can be provided to suit said specifications of said user.

Also according to the present invention, there is provided a custom laser resonator that will suit specifications of a user, said laser including a phase conjugated circular mirror which reverses wavefront of one particular input beam $\Psi_o(x)$ determined by said user, said input beam $\Psi_o(x)$ having a given wavelength, said laser resonator including an output coupler cooperating with said mirror and separated therefrom by a laser gain medium, said mirror being at a distance L from said output coupler, said mirror having a profile determined by $\Phi_o(x)$ where:

$$\Psi_L(x) = |\Psi_L(x)| e^{-i(2\pi/\lambda)\Phi_o(x)}$$

where:

$$\Psi_L(x) = (i2\pi)/(\lambda B) \int_0^\infty \Psi_o(x_o) e^{(-i\pi/\lambda B)(Ax_o^2+Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order; whereby a custom laser resonator can be provided to suit said specifications of said user.

The objects, advantages and other features of the present invention will become more apparent upon reading of the following non restrictive description of preferred embodiment thereof, given for the purpose of exemplification only with reference to the accompanying drawings.

DETAILED DESCRIPTION OF THE DRAWINGS

Figure 1:
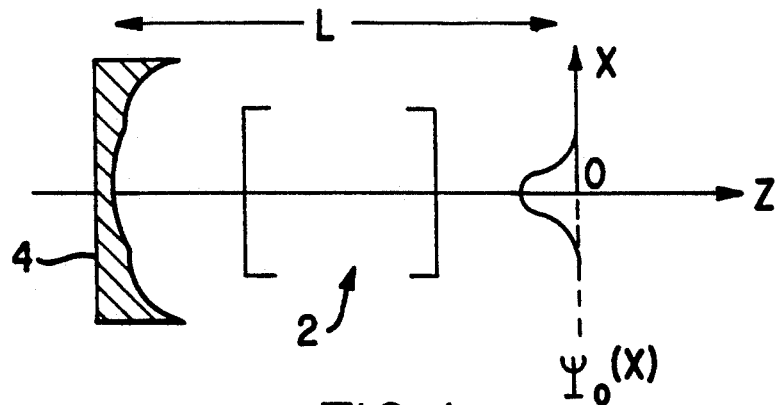
FIG. 1 is a schematic diagram illustrating the relation between a specified input beam $\Psi_o(x)$ with respect to a custom phase-conjugated mirror.

Referring now to FIG. 1, there is shown a schematic diagram illustrating the relation between a specified input beam $\Psi_o(x)$, a laser gain medium including an optical system 2, a custom phase-conjugated mirror 4 and the distance L. The process for making a custom phase-conjugated circular mirror to be used in a laser resonator that will suit specifications of a user will be described by means of FIG. 1. The mirror 4 reverses wavefront of one particular input beam $\Psi_o(x)$ determined by the user. The input beam $\Psi_o(x)$ has a given wavelength $\lambda$. The laser resonator includes the mirror 4 and an output coupler (not shown in this FIG. 1) cooperating with the mirror 4 and separate therefrom by a laser gain medium including optical elements 2. The mirror 4 is at a distance L from the output coupler (shown in FIG. 2). The process comprises steps of (a) determining the input beam $\Psi_o(x)$ that will suit need of the user; (b) calculating equation of $\Psi_L(x)$ which is a value of the input beam $\Psi_o(x)$ that is propagated through the laser gain medium at the distance L, where:

$$\Psi_L(x) = (i2\pi)/(\lambda B) \int_0^\infty \Psi_o(x_o) e^{(-i\pi/\lambda B)(Ax_o^2+Dx^2)} J_o[(2\pi x x_o)/\lambda B] x_o dx_o$$

where A, B and D are constants determined by the optical elements 2 in the laser gain medium, $x_o$ is an integration variable, x is radial distance in transverse direction of propagation, and $J_o$ is a Bessel function of zero order; (c) calculating phase $\Phi_o(x)$ of the input beam, which is a phase of the input beam $\Psi_o(x)$ at the distance L, where:

$$\Psi_L(x) = |\Psi_L(x)| e^{-i(2\pi/\lambda)\Phi_o(x)}$$

the phase $\Phi_o(x)$ determining profile of the custom phase-conjugated mirror; and (d) fabricating the custom phase-conjugated mirror according to the profile determined in step (c), whereby a custom phase-conjugated mirror can be provided to suit the specifications of the user.

When the mirror has a slab geometry, $\Psi_L(x)$ can be determined by the following equation:

$$\Psi_L(x) = (i/\lambda B)^{\frac{1}{2}} \int_{-\infty}^\infty \Psi_o(x_o) e^{[-i(\pi/\lambda B)(Ax_o^2-2x_ox+Dx^2)]} dx_o$$

The phase-conjugated mirror (PCM) is an optical component that reverses the wavefront of an incoming beam. A custom phase-conjugated mirror (CPCM) is an optical component that reverses wavefront of only one particular beam previously specified by the user.

The design of a CPCM proceeds as follows:

first, the specified beam $\Psi_o(x)$ is propagated through the optical system 2 till a distance L using, for example, the Huygen-Fresnel integral operator:

$$\Psi_L(x) = (i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where $\lambda$ is the wavelength of the beam. The above-mentioned equation has been written here for only one transverse dimension x. However, the generalization of two transverse dimensions is immediate;

second, the phase $\Phi_o(x)$ of this propagated complex beam is extracted according to:

$$\Psi_L(x) = |\Psi_L(x)| e^{-i(2\pi/\lambda)\Phi_o(x)}$$

third, a mirror is fabricated according to this profile $\Phi_o(x)$ using the appropriate technique for a given wavelength $\lambda$.

As a consequence of this design procedure, in general, any other beam than the specified one $\Psi_o(x)$, that passes through the same optical system 2 will, after reflection by the CPCM, diverge. Only the specified beam $\Psi_o(x)$ will, after reflection and passage through the same optical system 2, be completely phase-conjugated (reversed), resulting in a nearly exact replica of the specified beam $\Psi_o(x)$ at the same plane $z=0$.

This feature can be used to optimize many optical systems. An example is an optical laser resonator.

Figure 2:
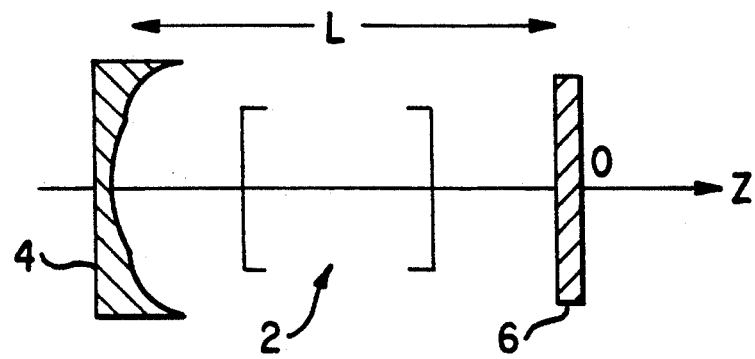
FIG. 2 is a schematic diagram illustrating a custom phase-conjugated mirror laser resonator.

Referring now to FIG. 2, there is shown a schematic diagram illustrating such laser resonator. The laser resonator is an open resonator formed by a reflecting mirror 4 and an output coupler 6 enclosing a laser gain medium including optical components 2. The laser resonator is made here with a CPCM 4 and an output coupler 6 enclosing an optical system 2. According to the theory of CPCM, the specified beam $\Psi_o(x)$ used to design the CPCM will necessarily be a low loss eigenmode of the resonator when the CPCM 4 has a large enough transverse dimension. This eigenmode will be of the stable type and the resonator can be described by a generalized G parameter related to the beam size (RMS)$W_o$ of the specified beam $\Psi_o(x)$, namely by the following first equation:

$$W_o^2 = M^2[(\lambda L)/\pi][G/(1-G)]^{\frac{1}{2}}$$

where $M^2$ is the beam quality factor.

Appropriate specification of the beam $\Psi_o(x)$ will lead to a large low loss fundamental eigenmode that improves the efficiency of the laser system. The discrimination feature of the laser resonator can be assessed by solving the usual eigen Huygen-Fresnel integral equation on a computer. For the practical situation of short length (L) of the resonator, an approximate differential equation of the eigenmodes $\Psi_n(x)$ can be derived from the following second and third equations:

$$[(d^2\Psi_n)/(dx^2)] + (E_n - V(x))\Psi_n = 0$$

where the potential $V(x)$ is proportional to the phase profile of the mirror and is related to the specified beam $\Psi_o(x)$ by:

$$V(x) = [1/\Psi(x)][(d^2\Psi_o)/(dx^2)]$$

These last two equations form a useful tool in order to specify a beam $\Psi_o(x)$ that results in a potential $V(x)$ having a low number of confined eigenmode solutions of the second equation. For example, for $\Psi_o(x) = \text{sech } x$, all the other modes $\Psi_n$ are unconfined resulting in high loss and highly perturbed by diffraction. This resonator has therefore only one transverse confined mode of the stable type and all the other higher modes are of the unstable type (unconfined). Although this differential equation is only approximated, it gives good information that can be confirmed by numerical calculation of the integral equation on the computer.

The fundamental eigenmode of the resonator being of the stable type characterized by a geometrical parameter G, all the optimized parameter relations for thermal lensing compensation do apply by simply changing the geometrical parameter G of the stable resonator by G of the above-mentioned first equation.

The beam $\Psi_o(x)$ used to generate the CPCM was specified onto the output coupler in the previous description of the resonator. However, the beam $\Psi_o(x)$ can be specified at any place inside or outside the resonator and the CPCM be designed by taking into account the extra propagation.

Figure 3:
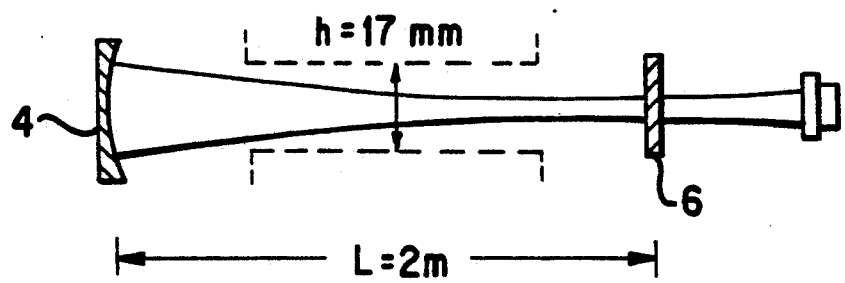
FIG. 3 is a schematic diagram illustrating a laser resonator made according to the present invention.

Two super-Gaussian output resonators have been demonstrated for a pulsed TEA-CO$_2$ laser and CW-CO$_2$ laser using the present design procedure. As shown on FIG. 3, the resonator is formed by a CPCM 4 and the output coupler 6 separated by a distance of 2 meters. The value of h is 17 mm. No additional optical elements were located inside the resonator, which means that the constants A and D equal 1, and B=L. The two CPCM profiles were generated according to the procedure described above for a specified output on the coupler $\Psi_o(x)$. Accordingly, for a first design procedure:

$$\Psi_o(x) = e^{-(x/3)^4}$$

where x is in millimeters, the distance L and B are substantially two meters, the constants A and D are 1, and $\lambda$ is substantially 10.6 micrometers. The profile of this mirror is shown more specifically on FIG. 4.

For a second design procedure, it has been determined that:

$$\Psi_o(x) = e^{-(x/3.5)^6}$$

where x is in millimeters, the distance L and B are substantially two meters, the constants A and D are 1, and $\lambda$ is substantially 10.6 micrometers. The profile of this mirror is shown more specifically on FIG. 5.

$$\Psi_o(x) = e^{-(x/3.5)^6}$$

It should be noted that these two resonators have a geometrical parameter G=0.5. The resonator formed by the mirror shown in FIG. 4, with a plane coupler, is a classical stable semi-confocal resonator.

These mirrors can be fabricated by using the diamond-turning technique on a cooper substrate. The CPCM aperture is limited here to a Fresnel number of 3.5 by the gain medium transverse dimension.

Figure 4:
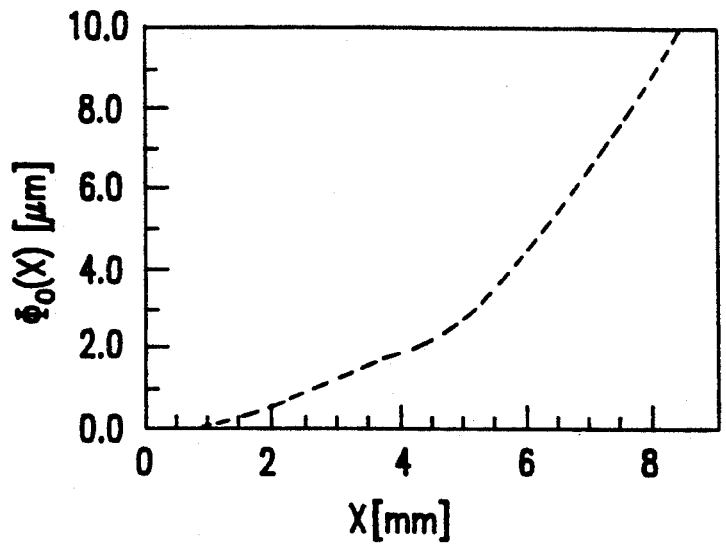
FIG. 4 is a diagram illustrating $\Phi_o(x)$ with respect to x for a given mirror.
Figure 5:
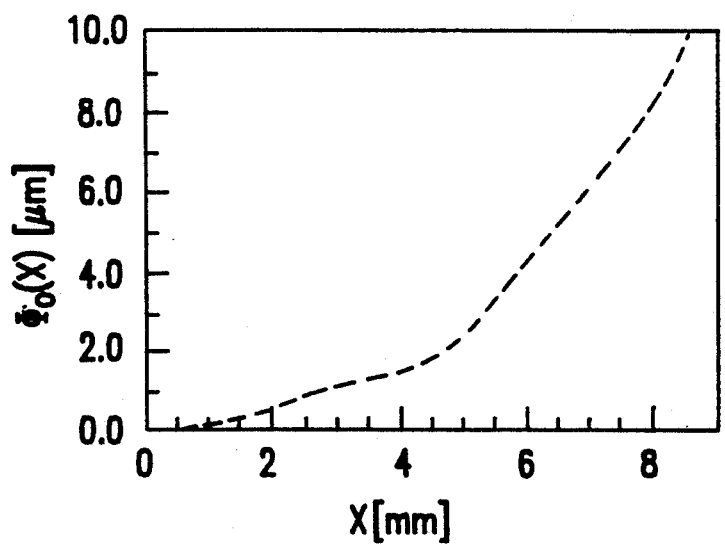
FIG. 5 is a diagram illustrating $\Phi_o(x)$ with respect to x for another given mirror.

For the TEA-CO$_2$ laser, the output energy in monomode operation is 690 mJ and 750 mJ for the mirrors shown respectively on FIGS. 4 and 5. This corresponds to an increase of laser efficiency of 40% and 50% for the mirrors shown respectively on FIGS. 4 and 5 as compared to a classical resonator.

For the CW-$CO_2$, the power output in monomode operation is 5.9 watts and 6.4 watts for the mirrors shown respectively on FIGS. 4 and 5, which corresponds to an increase of laser efficiency of 18% and 28% as compared to a standard resonator.

The super-Gaussian output of the resonator including the mirrors shown respectively on FIGS. 4 and 5 has much lower diffraction rings in the near field than a standard Gaussian output resonator.

Accordingly, there is provided a custom phase-conjugated circular mirror to be used in a laser resonator that will suit specifications of a user. The mirror reverses wavefront of one particular input beam $\Psi_o(x)$ determined by said user, the input beam $\Psi_o(x)$ having a given wavelength, the laser resonator including the mirror and an output coupler cooperating with the mirror and separated therefrom by a laser gain medium, the mirror being at a distance L from the output coupler, the mirror having a profile determined by $\Phi_o(x)$ where:

$$\Psi_L(x) = |\Psi_L(x)| e^{-i(2\pi/\lambda)\Phi_o(x)}$$

where:

$$\Psi_L(x) = (i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order; whereby a custom phase-conjugated mirror can be provided to suit said specifications of said user.

Also, there is provided a custom laser resonator that will suit specifications of a user, the laser including the phase conjugated circular mirror mentioned above.

Although the present invention has been explained hereinabove by way of a preferred embodiment thereof, it should be pointed out that any modifications to this preferred embodiment within the scope of the appended claims is not deemed to alter or change the nature and scope of the present invention.

We claim:

1. A process for making a custom phase-conjugated circular mirror to be used in a laser resonator that will suit specifications of a user, said mirror reversing wave front of one particular input beam $\Psi_o(x)$ determined by said user, said input beam $\Psi_o(x)$ having a given wavelength, said laser resonator including said mirror and an output coupler cooperating with said mirror and separated therefrom by a laser gain medium, said mirror being at a distance L from said output coupler, said process comprising steps of:
   (a) determining said input beam $\Psi_o(x)$ that will suit need of said user;
   (b) calculating equation of $\Psi_L(x)$ which is a value of said input beam $\Psi_o(x)$ that is propagated through said laser gain medium at said distance L, where:

$$\Psi_L(x) =$$

$$(i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order;
   (c) calculating phase $\Phi_o(x)$ of said input beam, which is a phase of said input beam $\Psi_o(x)$ at said distance L, where:

$$\Psi_L(x) = |\Psi_L(x)| e^{-i(2\pi/\lambda)\Phi_o(x)}$$

said phase $\Phi_o(x)$ determining profile of said custom phase-conjugated mirror; and
   (d) fabricating said custom phase-conjugated mirror according to said profile determined in step (c), whereby a custom phase-conjugated mirror can be provided to suit said specifications of said user.

2. A process according to claim 1, wherein said mirror has a slab geometry; wherein:

$$\Psi_L(x) = (i/\lambda B)^{\frac{1}{2}} \int_{-\infty}^\infty \Psi_o(x_o) e^{[-i(\pi/\lambda B)(Ax_o^2 - 2x_ox + Dx^2)]} dx_o.$$

3. A process according to claim 1, wherein:

$$\Psi_o(x) = e^{-(x/3)^4}$$

wherein x is in millimeters; and wherein said distance L and B are substantially two meters, said constants A and D are 1, and $\lambda$ is substantially 10.6 micrometers.

4. A process according to claim 1, wherein:

$$\Psi_o(x) = e^{-(x/3.5)^6}$$

wherein x is in millimeters; and wherein said distance L and B are substantially two meters, said constants A and D are 1, and $\lambda$ is substantially 10.6 micrometers.

5. A process for making a custom laser resonator that will suit specifications of a user, said laser including a phase conjugated circular mirror which reverses wave front of one particular input beam $\Psi_o(x)$ determined by said user, said input beam $\Psi_o(x)$ having a given wavelength, said laser resonator including an output coupler cooperating with said mirror and separated therefrom by a laser gain medium, said mirror being at a distance L from said output coupler, said process comprising steps of:
   (a) determining said input beam $\Psi_o(x)$ that will suit need of said user;
   (b) calculating equation of $\Psi_L(x)$ which is a value of said input beam $\Psi_o(x)$ that is propagated through said laser gain medium at said distance L, where:

$$\Psi_L(x) =$$

$$(i2\pi)/(\lambda B) \int_0^\infty \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order;

(c) calculating phase $\Phi_o(x)$ of said input beam, which is a phase of said input beam $\Psi_o(x)$ at said distance L, where:

$$\Psi_L(x) = |\Psi_L(x)| e^{-i(2\pi/\lambda)\Phi_o(x)}$$

said phase $\Phi_o(x)$ determining profile of said custom phase-conjugated mirror; and (d) fabricating said custom phase-conjugated mirror according to said profile determined in step (c), whereby a custom laser resonator can be provided to suit said specifications of said user.

6. A process according to claim 5, wherein said mirror has a slab geometry; wherein:

$$\Psi_L(x) = (i/\lambda B)^{\frac{1}{2}} \int_{-\infty}^{\infty} \Psi_o(x_o) e^{[-i(\pi/\lambda B)(Ax_o^2 - 2x_ox + Dx^2)]} dx_o.$$

7. A process according to claim 5, wherein:

$$\Psi_o(x) = e^{-(x/3)^4}$$

wherein x is in millimeters; and
wherein said distance L and B are substantially two meters, said constants A and D are 1, and $\lambda$ is substantially 10.6 micrometers.

8. A process according to claim 5, wherein:

$$\Psi_o(x) = e^{-(x/3.5)^6}$$

wherein x is in millimeters; and
wherein said distance L and B are substantially two meters, said constants A and D are 1, and $\lambda$ is substantially 10.6 micrometers.

9. A custom phase-conjugated circular mirror to be used in a laser resonator that will suit specifications of a user, said mirror reversing wave front of one particular input beam $\Psi_o(x)$ determined by said user, said input beam $\Psi_o(x)$ having a given wavelength, said laser resonator including said mirror and an output coupler cooperating with said mirror and separated therefrom by a laser gain medium, said mirror being at a distance L from said output coupler, said mirror having a profile determined by $\Phi_o(x)$ where:

$$\Psi_L(x) = |\Psi_L(x)| e^{-i(2\pi/\lambda)\Phi_o(x)}$$

where:

$$\Psi_L(x) = (i2\pi)/(\lambda B) \int_0^{\infty} \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order; whereby a custom phase-conjugated mirror can be provided to suit said specifications of said user.

10. A mirror according to claim 9, wherein said mirror has a slab geometry; wherein:

$$\Psi_L(x) = (i/\lambda B)^{\frac{1}{2}} \int_{-\infty}^{\infty} \Psi_o(x_o) e^{[-i(\pi/\lambda B)(Ax_o^2 - 2x_ox + Dx^2)]} dx_o.$$

11. A mirror according to claim 9, wherein:

$$\Psi_o(x) = e^{-(x/3)^4}$$

wherein x is in millimeters; and
wherein said distance L and B are substantially two meters, said constants A and D are 1, and $\lambda$ is substantially 10.6 micrometers.

12. A mirror according to claim 9, wherein:

$$\Psi_o(x) = e^{-(x/3.5)^6}$$

wherein x is in millimeters; and wherein said distance L and B are substantially two meters, said constants A and D are 1, and $\lambda$ is substantially 10.6 micrometers.

13. A custom laser resonator that will suit specifications of a user, said laser including a phase conjugated circular mirror which reverses wave front of one particular input beam $\Psi_o(x)$ determined by said user, said input beam $\Psi_o(x)$ having a given wavelength, said laser resonator including an output coupler cooperating with said mirror and separated therefrom by a laser gain medium, said mirror being at a distance L from said output coupler, said mirror having a profile determined by $\Phi_o(x)$ where:

$$\Psi_L(x) = |\Psi_L(x)| e^{-i(2\pi/\lambda)\Phi_o(x)}$$

where:

$$\Psi_L(x) = (i2\pi)/(\lambda B) \int_0^{\infty} \Psi_o(x_o) e^{(-i\pi/\lambda B)(Ax_o^2 + Dx^2)} J_o[(2\pi x x_o)/\lambda B] x_o dx_o$$

where A, B and D are constants determined by optical elements in said laser gain medium, $x_o$ is an integration variable, x is radial distance in transverse direction of propagation, and $J_o$ is a Bessel function of zero order; whereby a custom laser resonator can be provided to suit said specifications of said user.

14. A laser resonator according to claim 13, wherein said mirror has a slab geometry; wherein:

$$\Psi_L(x) = (i/\lambda B)^{\frac{1}{2}} \int_{-\infty}^{\infty} \Psi_o(x_o) e^{[-i(\pi/\lambda B)(Ax_o^2 - 2x_ox + Dx^2)]} dx_o.$$

15. A laser resonator according to claim 13, wherein:

$$\Psi_o(x) = e^{-(x/3)^4}$$

wherein x is in millimeters; and
wherein said distance L and B are substantially two meters, said constants A and D are 1, and $\lambda$ is substantially 10.6 micrometers.

16. A laser resonator according to claim 13, wherein:

$$\Psi_o(x) = e^{-(x/3.5)^6}$$

wherein x is in millimeters; and
wherein said distance L and B are substantially two meters, said constants A and D are 1, and $\lambda$ is substantially 10.6 micrometers.

* * * * *